Jan. 8, 1957  E. J. VALELUNGA  2,776,774
SNAP-IN OUTLET BOX
Filed June 5, 1956
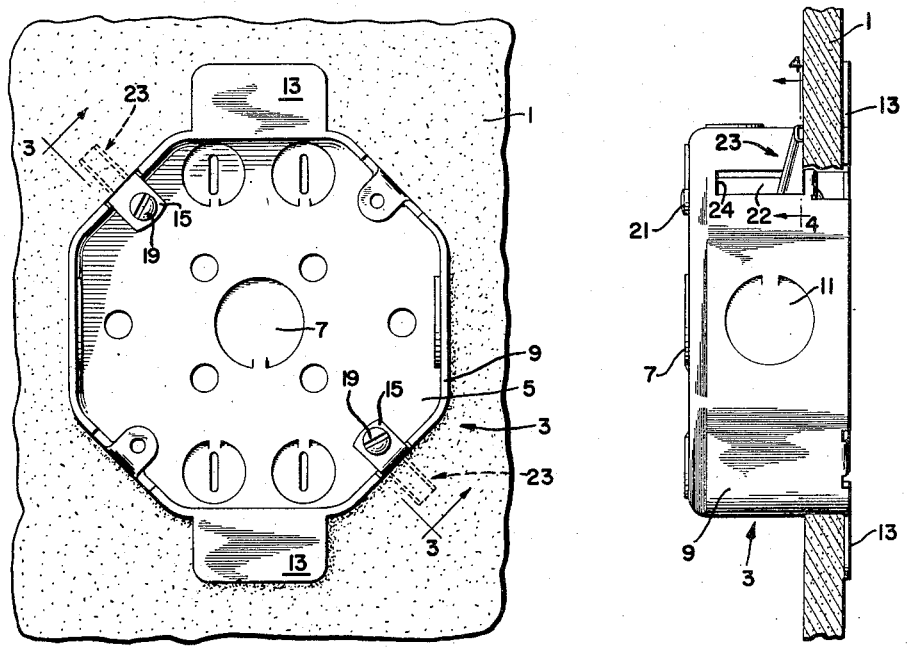
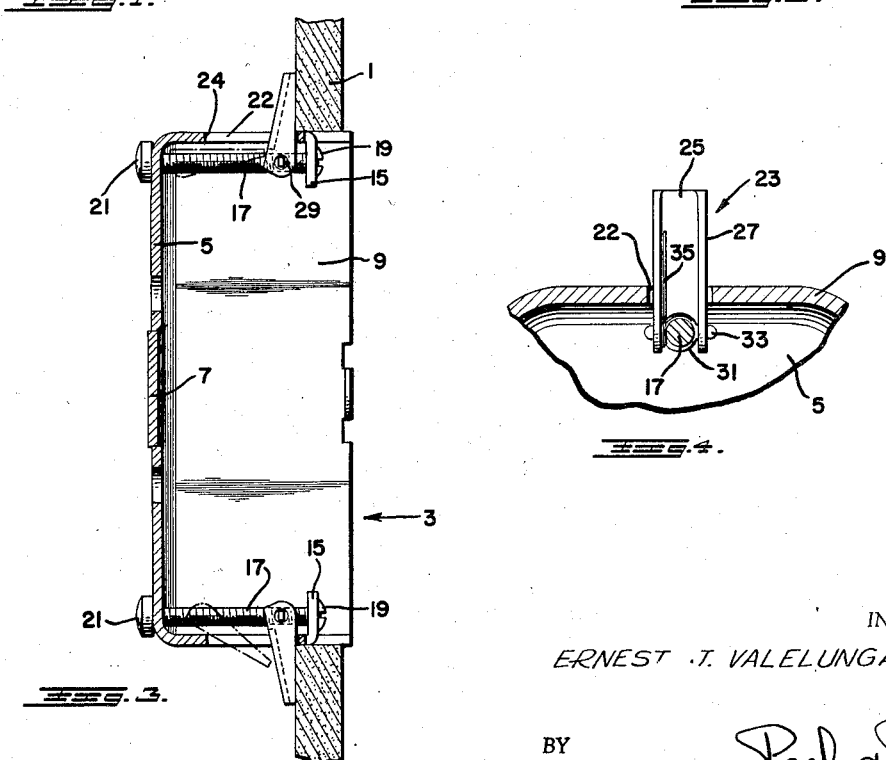
INVENTOR
ERNEST J. VALELUNGA
BY Peck & Peck
ATTORNEYS United States Patent Office 2,776,774
Patented Jan. 8, 1957

2,776,774

SNAP-IN OUTLET BOX

Ernest James Valelunga, Fulton, N. Y.

Application June 5, 1956, Serial No. 589,396

7 Claims. (Cl. 220—3.6)

This invention relates broadly to the art of electric outlet boxes and in its more specific aspects it relates to means whereby such boxes will be removably locked in position within a wall or ceiling structure and wherein the means for releasing such boxes from mounted position is readily accessible exteriorly of the box; and the nature and objects of the invention will be readily recognized and understood by those skilled in the arts to which it relates in the light of the following explanation and detailed description of the accompanying drawings illustrating what I at presently believe to be the preferred embodiments or mechanical expressions of my invention from among various other forms, arrangements, combinations and constructions, of which the invention is capable within the spirit and scope thereof.

Electric outlet boxes are mounted in walls and ceilings usually with the front face thereof flush with the wall or ceiling exterior surface and may be secured as by screwing to the lathing or other firm support in the framing structure for the opening for the outlet box which is provided in the wall or ceiling. It will be recognized that the task of securing such boxes as by screwing into the latching or other supporting structure is not only time-consuming but, for a variety of factors, may be difficult to accomplish. In any event it is essential that the outlet box be firmly secured in proper position within the wall or ceiling. In the mounting of such outlet boxes the builder or wiring contractor must bear in mind the possibility that the box may have to be removed at some later date and therefore the securing means should be accessible so that they may be reached if the box must be later removed from its fixed mounted position.

All of these requirements, as broadly outlined above, have produced a need for an outlet box of the general character with which I am concerned which may be inserted in the wall or ceiling opening and with slight manual manipulation will clamp or lock itself in mounted removably fixed position, and which may be easily and rapidly released for removal from its mounted position.

I have evolved an electric outlet box which fully meets the need for a simple and practical snap-in type outlet box.

It has been one of my purposes to provide an electric outlet box which is provided with wall clamping means to prevent outward movement of the box which are so formed and mounted that they will not require any manual positioning when the box is inserted into a wall or ceiling opening. In other words, the outlet box may be inserted regardless of the position of the clamping means. After the box is inserted into proper position, it is only necessary to cause the clamping means to move into box holding clamping position and this is a simple manual operation.

I have so arranged and constructed my apparatus that the mechanism whereby the clamping means is operated is readily accessible exteriorly of the box for later removal of the box should the occasion arise.

I have devised an electric outlet box having these advantageous attributes which is of simple construction and which will not add substantially to the cost of conventional electric outlet boxes.

The mechanism whereby I provide a self-locking outlet box may be added to existing conventional outlet boxes at small cost.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

Fig. 1 is a view in front elevation of an electric outlet box clampedly mounted in a wall or ceiling.

Fig. 2 is a view in side elevation of an electric outlet box clampedly mounted in a wall or ceiling.

Fig. 3 is a sectional view taken on line 3—3 of Fig. 1.

Fig. 4 is a detailed view taken on line 4—4 of Fig. 2.

In the accompanying drawings I have used the numeral 1 to designate a wall or ceiling surface having an opening therein adapted to receive an electric outlet box designated generally by the numeral 3. The wall or ceiling or any other structure in which the electric outlet box is to be mounted may be formed of a variety of materials such as wall or plasterboard, lathing which is adapted to receive the plaster, or the like partitioning members.

The electric outlet box 3 may be of generally conventional structure formed of metal and including a back wall 5 having a number of knock-out discs 7 therein and sides 9 which may be provided with knock-out discs 11. A pair of oppositely disposed tabs 13 extending outwardly from the wall 9 of the outlet box may be provided to abut against wall 1 and thereby prevent the outlet box from being inwardly moved. While I have illustrated an octagonal type box in the drawings, it is to be understood that this is by way of example and not limitation and my invention may be used with boxes of any shape or configuration.

I provide a pair of tabs 15 which are struck from the wall 9 of the outlet box preferably at opposite points thereon and extend inwardly of the box. It is preferable that the metal of the wall which is bent inwardly forming the tabs be struck from the wall body so that the tabs 15 will project inwardly of the box at a distance below the outer edge of the wall. Each tab 15 is formed with a circular opening therethrough and a circular opening is formed in the bottom wall 5 of the outlet box opposite and in alignment with each opening in a tab. I rotatively mount a screw 17 in each opening in each tab to extend therethrough and rotatively through the opposite aligned opening in the bottom wall of the outlet box. The screws 17 at their outer ends are formed with slotted heads 19 which are disposed on the outer sides of the tabs 15 and on the opposite end of each screw I fix a head 21. The heads 19 and 21 are of greater diameter than the circular openings in the tabs and the bottom wall so that the screws 17 are fixed against axial movement but are rotatively mounted. The walls of the outlet box are formed with slots 22 therein which are formed in the wall adjacent each screw 17. The slots 22 do not extend all the way to bottom wall 5 in order to provide a bearing or fulcrum point 24 at the base of each slot.

As a means for removably fastening the outlet box in position in the opening in the wall or other partition member, I provide clamping arms designated generally by the numeral 23 and it is to be understood that I provide one such clamping arm for each screw 17. Each clamping arm is preferably of metal and of channel shape providing a web 25 and a pair of flanges 27. The flanges are preferably though not necessarily of uniformly decreasing width outwardly toward the end of the arm. At the inner ends of the flanges 27 aligned openings 29 are provided for a purpose which will presently become apparent.

Each screw 17 is adapted to operatively mount a clamping arm 23 for movement of the clamping arm axially relative to the screw to and from operative clamping position and inoperative retracted position. I provide a collar 31 which extends between the flanges 27 of the clamping arms and is mounted between such flanges by means of ears or pins 33 which are extended through the openings 29 and are then flattened in order to be maintained in position extending through such openings. The collar 31 surrounds the screw 17 and is so constructed that it meshes with the threads of the screw and thus functions as a nut mounted on the screw. The clamping arms are mounted on the screws by means of the nut collar 31 and pins 33 and consideration of the drawings will make it apparent that each clamping arm is pivotally mounted on its screw by means of the pins 33 in such manner that in certain positions of the clamping arm relative to the screw the latter will be received between the flanges of the clamping arm, and the clamping arms are mounted so that flanges are facing the wall 1 in which the outlet box is mounted. I provide spring means 35 which is associated with each clamping arm in such a manner that each clamping arm is biased and constantly urged outwardly away from its position lying closely adjacent the screw with the latter received between the flanges of the clamping arm.

The outlet box of this invention may be inserted into mounted position within an opening in the wall 1 merely by inserting the box into the opening until the outer tabs 3 are in abutment with the outer surface of the wall. The clamping arms may be in any position with respect to the screws when the box is inserted and since they are pivotally mounted on the screws, they will swing inwardly when engaged by the wall and will assume the position illustrated by dotted lines in Fig. 3 of the drawings. In such position, as disclosed by the dotted lines, each clamping arm will swing inwardly toward the screw and will receive the screw between the flanges. As soon as the box is inserted far enough, the arms will swing outwardly from the screws under the action of the springs 35. With the outlet box in inserted position and the arms outwardly swung, it is then only necessary to rotate the screws 17, by means of a screw driver, in the proper direction to move the clamping arms axially outwardly along the screws until the arms are in clamping engagement with the inner surface of the wall 1, as clearly illustrated in full lines in the drawings. It will be understood that the longitudinal edge of the slots will prevent rotary movement of the arms. In the event that it is necessary to remove an outlet box from its mounted position, the operation is equally simple. The screws are rotated in the opposite direction to cause the clamping arms to move inwardly along the screws, the collars 31 during this operation functioning as nuts on the screws. When the clamping arms have been axially moved inwardly a sufficient distance, they will engage the bearing points 24 at the bases of the slots and as the rotation of the screws is continued the clamping arms will be forced inwardly against the action of the springs and toward the screws. The action of the bearing points on the clamping arms is illustrated in dotted lines in the lower portion of Fig. 3 of the drawings. When each clamping arm is in fully retracted position, as shown in the top portion of Fig. 3, the box may be removed for the clamping arms will then clear the wall 1.

It will now be appreciated that I have evolved a practical self-locking outlet box which may be inserted and removed from walls with facility. It will also be appreciated that I have accomplished this without adding substantially to the cost of conventional outlet boxes and without providing a complex device.

I claim:

1. An outlet box having a bottom wall and side walls and means for removably clamping said outlet box in a wall structure, said means including a screw rotatively extending through said bottom wall and into the box, means preventing axial movement of said screw when it is rotated, a clamping arm pivotally mounted on said screw and means causing axial movement of said clamping arm along said screw in either direction dependent upon the direction of rotation of the screw, said side walls having a slot therein adjacent said screw, biasing means constantly urging said clamping arm to pivot outwardly through said slot from the screw and into operative wall clamping position when the screw is rotated in one direction and further means on said side walls engaging and causing said clamping arm to pivot inwardly when the screw is rotated in the other direction into position within the outlet box and into position adjacent said screw for removal of the outlet box from clamped position within the wall structure.

2. An outlet box having bottom and side walls and means for removably clamping said outlet box in a wall structure, said means including a screw rotatively mounted and extending into said box and having its operative head facing the forward side of the box, means preventing axial movement of the screw when it is rotated, a clamping arm pivotally mounted on said screw and means causing axial movement of said clamping arm along said screw in either direction dependent upon the direction of rotation of the screw, said side walls having a slot therein adjacent said screw, biasing means constantly urging said clamping arm to pivot outwardly through said slot from the screw and into operative wall clamping position when the screw is rotated in one direction and further means engaging said clamping arm when it has axially traveled inwardly a distance along said screw when the screw is rotated in the other direction and said means causing it to pivot inwardly within the outlet box and into position adjacent said screw for removal of the outlet box from clamped position within the wall structure.

3. An outlet box having bottom and side walls and said side walls having an inwardly directed tab struck therefrom, means for removably clamping said outlet box in a wall structure, said means including a screw rotatively extending through said bottom wall and said tab, said screw having a head on its inner end and an operating head on its outer end, a clamping arm pivotally mounted on said screw and means causing axial movement of said clamping arm along said screw in either direction dependent upon the direction of rotation of said screw, said side walls having a slot therein adjacent said screw, biasing means constantly urging said clamping arm to pivot outwardly through said slot from the screw and into operative wall clamping position when the screw is rotated in one direction and the inner wall of said slot forming a bearing point and engaging and causing said clamping arm to pivot inwardly when the screw is rotated in the other direction into position within the outlet box and into position adjacent said screw for removal of the outlet box from clamped position within the wall structure.

4. An outlet box having a bottom wall and side walls and means for removably clamping said outlet box in a wall structure, said means including a screw rotatively extending through said bottom wall and into the box, means preventing axial movement of said screw when it is rotated, a clamping arm pivotally mounted on said screw and means causing axial movement of said clamping arm in either direction dependent upon the direction of rotation of said screw, said clamping arm being of channel formation providing a pair of flanges connected by a web, said side walls having a slot therein adjacent said screw, biasing means constantly urging said clamping arm to pivot outwardly through said slot from the screw and into operative wall clamping position when the screw is rotated in one direction and further means on said side walls engaging and causing said clamping arm to pivot inwardly into position with the screw received between said flanges when the screw is rotated in the other direction for removal of the outlet box from the wall structure.

5. An outlet box in accordance with claim 4 wherein said means for causing axial movement of said clamping arm along said screw in either direction comprises a collar threadedly mounted on said screw and mounted in said flanges of the clamping arm for pivotal movement of the latter on the screw.

6. An outlet box in accordance with claim 4 wherein said means for causing axial movement of said clamping arm along said screw in either direction comprises a collar extending about said screw and threadedly attached thereto and having a pin at each end pivotally mounted in openings provided in the flanges of the clamping arm.

7. An outlet box having bottom and side walls and said side walls having an inwardly directed tab struck therefrom, means for removably clamping said outlet box in a wall structure, said means including a screw rotatively extending through said bottom wall and said tab, said screw having a head fixed on its inner end and an operating head on its outer end, a clamping arm of channel construction providing a pair of flanges connected by a web, a collar extending about and threadedly connected to said screw and having pins extending therefrom, the pins being pivotally mounted in openings provided in one end of said flanges of the clamping arm for pivotal mounting of the clamping arm on the screw for axial movement therealong in either direction dependent upon the direction of rotation of the screw, said side walls having a slot therein adjacent the screw, biasing means constantly urging the clamping arm to pivot outwardly through said slot into operative wall clamping position when the screw is rotated in one direction and the inner wall of said slot forming a bearing point and engaging and causing said clamping arm to pivot inwardly into position with the screw received between said flanges when the screw is rotated in the other direction for removal of the outlet box from the wall structure.

References Cited in the file of this patent

UNITED STATES PATENTS

| 1,775,665 | Behm | Sept. 16, 1930 |
| 1,957,003 | Selen | May 1, 1934 |
| 2,272,846 | Lindstrom | Feb. 10, 1942 |
| 2,357,787 | Windsheimer | Sept. 5, 1944 |